United States Patent Office 3,046,242
Patented July 24, 1962

3,046,242
METHOD FOR PRODUCING AQUEOUS SILANOL DISPERSION BY CONTACTING A METAL SILICONATE WITH A CATION EXCHANGER AND PRODUCT THEREOF
Thomas R. Santelli, Toledo, Ohio., assignor to Johns-Manville Corporation, New York, N.Y., a corporation of New York
No Drawing. Continuation of application Ser. No. 279,470, Mar. 29, 1952. This application May 19, 1961, Ser. No. 111,145
9 Claims. (Cl. 260—29.2)

The invention relates to the production of aqueous silanol dispersions which have excellent stability and which fill an important industrial need. This application is a continuation of copending application Serial No. 279,470, filed March 29, 1952, now abandoned.

Silicones are known to have great potential value as coating compositions because of the water repellency, heat resistance and other valuable properties of coatings produced from silicones. Silicones themselves are relatively inexpensive to manufacture, but one of the greatest impediments to the commercialization of silicones is that they have not been available in the form of stable aqueous solutions. There is an important industrial need for a method of applying silicones in aqueous solution, because the use of an aqueous solution is necessary in large-volume, low-cost operations. Moreover, the need is for a method of applying silicones in dilute aqueous solution. It is not practical to use a concentrated solution in low-cost coating operations because chemicals such as silicones must be applied in very small quantities per square foot in order to avoid prohibitive costs. In order to apply small quantities per square foot, dilute solutions must be used.

Dilute solutions of silicones in organic solvents are available, but the use of such solutions is seriously restricted by the cost of the organic solvents and by the fire hazard.

The use of an aqueous solution for applying an agent to produce water repellency would be very desirable, not only for reasons of economy and safety, but also because a material that requires treatment to render it water repellent is always a material that is readily wet by an aqueous solution. It is the ease with which such a material is wet by water that is the occasion for the treatment to impart water repellency to the material. However, the use of an aqueous solution to apply an agent for imparting water repellency is inherently difficult because agents that impart water repellency are of such a nature that they are not readily available in aqueous solutions.

For want of a better method of applying silicone coatings, persistent attempts have been made during the past ten years to commercialize methods of applying silicone coatings by treatment with a vapor, such as methyltrichlorosilane. However, such vapor treatment requires expensive equipment and the treated surface must be given an after-treatment with another vapor such as ammonia.

The application of silicones in the form of aqueous emulsions also has been suggested. The disadvantage of this method is that a surface-active agent must be used in order to form an emulsion, and the presence of such an agent tends to cause a serious reduction in the water repellency of the coating that is produced.

The principal object of the invention is the production of aqueous silanol dispersions of superior stability. More specific objects and advantages are apparent from the description, which illustrates and discloses but is not intended to limit the invention.

United States Patents Nos. 2,441,423 and 2,507,200 disclose a method of producing an alkaline aqueous solution, in which a chlorosilane is hydrolyzed by adding it to ice water, and the resulting polysiloxane is dissolved in an aqueous solution of a strong inorganic base. These patents state that the strongly alkaline solution of a siliconate thus produced cannot be neutralized without causing reprecipitation of the polysiloxane. Therefore, the alkaline siliconate solutions are used in accordance with the disclosures of the patents without neutralization or with only partial neutralization, or are converted to alcohol solutions by diluting them with a large volume of an alcohol in order to permit them to be neutralized without precipitation.

The disadvantage of the method desclosed by these patents in that the aqueous solutions prepared in accordance with such method are applied in an alkaline condition. In order to prevent the alkali from attacking the material to which the alkaline aqueous solutions are applied and in order to improve the water repellency, it is necessary to wash the coated material repeatedly with water or to expose the coated material to an atmosphere of carbon dioxide. The additional operation of exposing the coated material to an atmosphere of carbon dioxide in a closed chamber or repeatedly washing and rinsing the coated material is inconvenient and expensive, and the washing operation causes the loss of some of the coating.

It is true, as indicated by Patents Nos. 2,441,423 and 2,507,200, that an alkaline aqueous solution of a siliconate tends to precipitate when an attempt is made to neutralize it. In fact, when such a solution of a siliconate is neutralized in the ordinary manner, the silicone precipitates from the solution. It is for the foregoing reasons that these patents state that an aqueous solution of a siliconate can be only partially neutralized.

The present invention is based upon the discovery that an aqueous silanol dispersion of remarkable stability can be obtained by bring the pH of an aqueous siliconate solution to a value between 3 and 7 by contacting such solution with the hydrogen form of a cation exchanger.

It is believed that a siliconate in an alkaline aqueous solution is a salt of an organo-substituted silicic acid. It is further believed that the precipitate that was formed heretofore when an attempt was made to neutralize an alkaline siliconate solution consisted of a silicone resin (polysiloxane) produced by the condensation of the silanol (organo-substituted silicic acid) that is formed by neutralization of the siliconate.

In contrast, the aqueous dispersion having a pH between 3 and 7 that is produced by the present method is a stable aqueous dispersion of a silanol.

The aqueous dispersions produced in the practice of the present invention are remarkable for their stability. Their stability is so great that they may be produced in relatively concentrated form.

The term "dispersion" refers to a system (i.e., a disperse system) which consists of submicroscopic particles of a substance (dispersoid) suspended in a dispersing medium. The characteristic properties of disperse systems are attributable to the enormous surface of the dispersed phase. The particles of submicroscopic size may be so small that the dispersion may be indistinguishable from a true solution. When the particles of submicroscopic size are small enough to have great surface area but large enough so that the solution is not strictly homogeneous and the presence of discrete particles can be detected with the ultramicroscope, the system may be considered colloidal. Thus, a composition embodying the present invention is defined as an aqueous "dispersion" of a silanol because the particles of such silanol are submicroscopic in size and may be in true solution in the aqueous dispersing medium or may be in a colloidal state in the aqueous dispersing medium.

It has been found to be possible, by reducing the pH of a siliconate solution rapidly, to neutralize such a solution without the use of a cation exchanger. However, the stability of the resulting silanol dispersion is considerably less than the stability of a silanol dispersion produced by contacting an aqueous siliconate solution with the hydrogen form of a cation exchanger in accordance with the present method. This fact has been demonstrated as follows:

A sample of an aqueous 1 percent ethylsiliconate solution, prepared as hereinafter described, was neutralized to a pH of 4 by the addition over a period of five minutes with vigorous stirring of concentrated hydrochloric acid. In the succeeding forty-five to sixty minutes a slight precipitate started to form in the solution.

A second sample of the same ethylsiliconate solution was drawn with suction through a glass tube approximately two and one-half inches in diameter and thirty inches in length than was one-half filled with a cationic exchanger (the Rohm and Haas sulfonic acid type cation exchange resin "IR–120"). The resulting silanol solution was entirely free of precipitate for over twelve hours thereafter.

The silanol in a stable aqueous silanol dispersion produced by the present method has an average unit structure corresponding to the formula $$R_mSi(OH)_nO\left(\frac{4-(mv+n)}{2}\right)$$

wherein $m$ is a number from .05 to 3; $n$ is a number from 1 to 3.95; the sum of $mv+n$ is from 2 to 4; $v$ is the average valence of the groups R; and the groups R are organic groups of the class consisting of saturated hydrocarbon groups having from one to five carbon atoms, olefinically unsaturated hydrocarbon groups having from two to five carbon atoms and aromatic hydrocarbon groups having from six to seven carbon atoms. The term "monomeric silanol" is used herein to mean a substance whose molecule contains one silicon atom to which from one to three hydroxy groups are attached, or two to three such silicon atoms which are connected by divalent organic groups, the remaining free valences of the silicon atom(s) being attached by

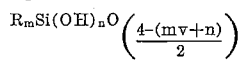

linkages to monovalent organic groups. A silanol produced by the present method may be partially condensed, i.e., may contain some polymeric molecules which can be considered to be derived by condensation between hydroxy groups attached to silicon atoms in two or more molecules of monomeric silanols, with the formation of

linkages. Thus, the letter "$n$" in the formula for the average unit structure of a silanol produced by the method of the invention indicates the average degree of condensation in the silanol molecules. It is believed, however, that in at least part of the molecules of such a silanol $n$ equals $4-mv$, i.e., that at least part of the silanol molecules remain in monomeric form, since the fact that a silanol produced by the present method is capable of being dispersed in an aqueous medium to form an aqueous silanol dispersion, as hereinbefore discussed, indicates that the silanol molecules are of very low average molecular weight.

In the formula representing the average unit structure of a silanol produced in the practice of the invention, the letter "R" is used to indicate the type of group that may be attached to the silicon atoms in the silanol molecules. However, the use of a single letter is not intended to indicate that all the groups of that type are the same. For example, in the molecule of a silanol in which more than one group R is attached to a silicon atom (i.e., $m$ is two or three), each group R may be different. (A silanol in which the groups R are not all the same may be prepared from, e.g., a monofunctional organosilane starting material in which all three organic groups attached to the silicon atom are not the same, or from a mixture of trifunctional silanes in which the organic groups attached to the silicon atoms are not all the same.) When the silanol contains, e.g., some dimeric molecules, each unit of a dimeric molecule may contain a different organic group attached to the silicon atom. Thus in the structure of a silanol employed in the practice of the invention, the organic groups attached to silicon atoms in the silanol molecules are not limited to a single specific group (i.e., R in the formula for the average unit structure of the silanol is not limited to a single specific group but may be one or more of the various organic groups hereinafter described).

In general the ratio of the total number of non-hydrolyzable groups (i.e., organic groups R) to the total number of silicon atoms in a silanol produced in the practice of the invention (i.e., the "$r$/Si ratio," in which $r$ is the total number of non-hydrolyzable groups attached to silicon atoms in the silanol and Si is the total number of silicon atoms therein, or $m$ in the formula given above corresponding to the average unit structure of a silanol) is at least about .05 and is not higher than about 3. It is preferred that the $r$/Si ratio of a silanol produced in the practice of the invention be from about 1 to about 2. When R is phenyl, it is often most desirable that the $r$/Si ratio be not more than 1.

An organic group R may be a monovalent organic group, or a divalent organic group connecting two silicon atoms. (Thus $v$ in the above formula is a number from 1 to 2.) When R in the formula for the average unit structure of a silanol produced by the present method is a divalent organic group, the silanol is hereinafter referred to as a "cross-linked silanol." Although the formula given above represents only one unit of a cross-linked silanol, a molecule of a cross-linked monomeric silanol used in the present method contains two silicon atoms connected by a divalent group, or three silicon atoms connected by two or three divalent groups. (The formula for the type of cross-linked silanol in which three silicon atoms are connected by three divalent groups is, of course, cyclic.)

A monovalent hydrocarbon group having from one to five carbon atoms may be a straight or branched chain primary, secondary, or tertiary alkyl group having from one to five carbon atoms (i.e., a methyl, ethyl, 1-propyl, isopropyl, 1-butyl, isobutyl, 2-butyl or tertiary butyl group, or any primary, secondary or tertiary amyl group), an alkenyl group having from two to five carbon atoms or a cyclopentyl group.

A monovalent aromatic hydrocarbon group having from six to seven carbon atoms is an aryl group, i.e., a phenyl group or a tolyl group, or an aralkyl group, i.e., a benzyl group.

A divalent organic group R may be (1) a saturated divalent group which can be considered to be derived by the removal of two hydrogen atoms from the molecule of an alkane having from one to five carbon atoms (i.e., the divalent aliphatic group may be methylene, ethylene, trimethylene, propylene, or any butylene or amylene group), or from the molecule of cyclopentane, or (2) a divalent aromatic group which can be considered to be derived by the removal of two hydrogen atoms from the molecule of benzene or toluene.

It is preferred that the monomeric molecule of a silanol produced by the present method contain only one silicon atom and that any monovalent saturated or olefinically unsaturated hydrocarbon groups attached to silicon atoms in a silanol produced by the present method contain from one to four carbon atoms. It is preferred also that they consist of primary or secondary groups, and it is most desirable that they consist of vinyl groups, or primary or secondary alkyl groups having from two to four carbon atoms, particularly butyl groups. It is preferred that any aromatic hydrocarbon groups attached to silicon atoms in a silanol produced by the present method be phenyl groups.

SILICONATE SOLUTION

A stable aqueous dispersion of a silanol is produced by the present method from an aqueous solution comprising a siliconate of a metal of the class consisting of alkali metals and alkaline earth metals, the average number and the type of organic groups attached to silicon atoms in the siliconate solution being of the classes hereinbefore defined. The aqueous solution of a siliconate of a metal of the class consisting of alkali metals and alkaline earth metals that is used as a starting material in the practice of the invention may be prepared by simply mixing a hydrolyzable organosilane composition or the silicone hydrolysis products thereof, in which the organic groups are saturated or olefinically unsaturated hydrocarbon groups having from one to five carbon atoms, as hereinbefore described, or phenyl, benzyl or tolyl groups, with an aqueous solution of an alkali metal base or an alkaline earth metal base, as hereinafter further discussed.

The term "hydrolyzable organosilane composition" is used herein to include not only (1) a single hydrolyzable organo-substituted silane having the general formula

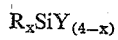

or having the general formula

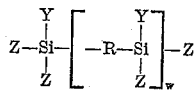

or

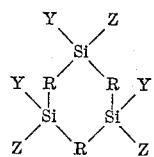

wherein the groups R are organic groups as hereinbefore defined, $w$ is an integer from one to two, $x$ is an integer from one to three, Y is a hydrolyzable group and Z is a monovalent organic group of the same class as the monovalent organic groups R, or a hydrolyzable group, but also (2) mixtures of two or more such hydrolyzable organo-substituted silanes, and mixtures of one or more such hydrolyzable organo-substituted silanes with one or more tetra-functional silanes having the general formula $SiY_4$ wherein Y is a hydrolyzable group. A hydrolyzable organosilane composition used in the practice of the invention may comprise from 5 to 100 mol percent of a hydrolyzable organo-substituted silane or mixture of such silanes and from 0 to 95 mol percent of a tetra-functional silane or mixture of tetra-functional silanes. (The terms "percent" and "parts" are used herein to mean percent and parts by weight unless otherwise specified.)

"Hydrolyzable group" is used herein to include halo, alkoxy, amino, aroxy and acyloxy. The halo group is any one having an atomic weight less than 80 (i.e., fluoro, chloro or bromo). The alkoxy group is any primary or secondary alkoxy group having from one to four carbon atoms (i.e., methoxy, ethoxy, 1-propoxy, isopropoxy, 1-butoxy, isobutoxy or 2-butoxy). Amino is simply the —NH$_2$ group. Aroxy groups are any in which the aryl group is phenyl, or a mono-, di- or tri-substituted phenyl group, each substituent being a primary, secondary or tertiary alkyl group having from one to five carbon atoms, the total number of carbon atoms in the side chains being not more than five (i.e., the aryl group is phenyl, or ortho-, meta- or para-methyl phenyl, any di- or trimethyl phenyl, or any substituted phenyl in which the substitu- ents are: one ethyl; one ethyl and one methyl; two ethyls; two methyls and one ethyl; two ethyls and one methyl; either propyl group; either propyl group and methyl; either propyl group and two methyls; either propyl group and ethyl; any butyl group; any butyl group and methyl; or any pentyl group). The acyloxy group has the general formula

in which Z is a saturated or unsaturated straight, branched or closed chain aliphatic or cycloaliphatic hydrocarbon group having from one to eighteen carbon atoms, or phenyl or substituted phenyl, the substituents, if any, consisting of from one to three alkyl groups each having from one to five carbon atoms, and all having a total of not more than five carbon atoms, as hereinbefore described.

It is preferred that a monovalent organic group attached to a silicon atom in a hydrolyzable silane that is an alkenyl group be an alpha-beta-unsaturated group such as a vinyl group, and that there be not more than one such group per silicon atom. Beta-gamma-unsaturated groups in alkenylsilanes, particularly methallyl groups in methallylsilanes, tend to be highly unstable during hydrolysis of such silanes under the conditions hereinafter described. Thus, beta-gamma-unsaturated groups, like betal-halo-substituted alkyl groups, may be considered to be hydrolyzable groups in the practice of the invention, since such groups are removed from silane starting materials during hydrolysis in the production of siliconates.

Examples of hydrolyzable organo-substituted silanes that may be used as starting materials for the preparation of a siliconate solution to be employed in the practice of the present invention include: methyltrichlorosilane, methyltribromosilane, methyltrifluorosilane, ethyltrifluorosilane, diethyldifluorosilane, ethyltrichlorosilane, diethyldichlorosilane, diethyldiethoxysilane, diethylchloroethoxysilane, ethyltrimethoxysilane, ethyltriethoxysilane, ethylchlorodiethoxysilane, ethyltripropoxysilane, ethyltri-1-butoxysilane, ethyltriisopropoxysilane, 1-propyltrichlorosilane, isopropyltrichlorosilane, 1-propyltrifluorosilane, 1-propyltriethoxysilane, dipropyldiethoxysilane, dipropyldichlorosilane, 1-butyltrichlorosilane, isobutyltrichlorosilane, 1-butyltriethoxysilane, isobutyltriethoxysilane, dibutyldifluorosilane, 1-butyltributoxysilane, 1-pentyltrichlorosilane, isoamyltrichlorosilane, 1-pentyltrifluorosilane, 1-pentyltriethoxysilane, di-1-pentyldifluorosilane, secondary butyltrichlorosilane, secondary amyltrichlorosilanes, phenyltrichlorosilane, phenyltriethoxysilane, phenyltrifluorosilane, diphenyldichlorosilane, p-tolyltrichlorosilane, p-tolyltriethoxysilane, phenylmethyldichlorosilane, vinyltrichlorosilane, vinyltriethoxysilane, methylvinyldichlorosilane, ethylvinyldichlorosilane, vinyldichlorosilane, bis(trichlorosilyl)isobutanes, tri(dichlorosilylmethylene), trichlorosilylmethyltrichlorosilane, 1,2-bis(trichlorosilyl)-ethane, 1,3-bis(trichlorosilyl)propane, and bis(trichlorosilyl)benzene.

Examples of tetra-functional silanes that may be used as starting materials in the present method include: ethyl orthosilicate, propyl orthosilicate, phenyl orthosilicate, silicon tetrachloride, silicon tetrafluoride and silicon tetrabromide.

If desired, a siliconate used in the present method can be prepared from a silane starting material which can be considered to be derived by replacing with a hydrogen atom a hydrolyzable group in an organosilane whose molecule contains more than one hydrolyzable group attached to a silicon atom. Such starting materials include, for example, diethylchlorosilane, and methylchlorosilane. It is to be understood, of course, that when the hydrolyzable organosilane composition used in the preparation of a siliconate to be employed in the production of a silanol of the invention comprises such a silane, hydrogen atoms may be present in place of some of the hydroxy groups in the formula for the average unit structure of the silanol. No substantial difference in the properties of the resulting silanol can be detected, however, when hydrogen atoms are thus present in place of some of the hydroxy groups.

The preferred hydrolyzable organo-substituted silane starting materials for use in the preparation of a siliconate solution are monorgano- and diorgano-substituted silanes in which the organic groups are phenyl groups or alkyl groups having from one to four carbon atoms or vinyl groups. When the organic groups consist of alkyl groups, it is preferred that they be primary or secondary alkyl groups having from two to four carbon atoms.

Because the hydrolyzable groups are removed from the silane starting materials in the preparation of a siliconate solution, it does not matter which hydrolyzable group or groups are present in the silane starting materials. The significant group for the purposes of the present invention is —OH, and any group that is replaced upon hydrolysis by —OH can be used in the practice of the invention. For this reason economic considerations govern the choice of hydrolyzable groups. The least expensive and most readily available are preferred, but the by-products formed in the reaction may also govern the choice of hydrolyzable groups. (For example, since vapors from methoxysilanes are highly toxic, it is usually not desirable to hydrolyze silane mixtures in which the hydrolyzable groups are methoxy groups.) It is preferred that the hydrolyzable groups in any one mixture of silanes used in the preparation of a siliconate employed in the method of the invention be chloro or ethoxy groups. Although the hydrolyzable groups in any one mixture of silanes which is hydrolyzed in the preparation of a siliconate may be different, it is preferred that they be the same, since the hydrolysis is more readily controlled when all the hydrolyzable groups are the same.

In the preparation of a water-soluble siliconate of an alkali metal (i.e., sodium or potassium) or an alkaline earth metal (i.e., calcium, barium or strontium), a hydrolyzable organosilane composition, as hereinbefore described, may be simply mixed with an aqueous solution of an alkali metal base or an alkaline earth metal base (e.g., the hydroxide of any such metals).

For example, a water soluble siliconate is conveniently prepared by mixing a hydrolyzable silane composition in which the hydrolyzable groups consist of alkoxy groups (preferably, of course, ethoxy groups) with an aqueous solution of sodium or potassium hydroxide. It is preferable to use about one mol of the base per mol of the organoalkoxysilane so that a hydrogen atom from only one of the hydroxy groups attached to a silicon atom in the molecule of the monomeric silanol resulting from the hydrolysis is replaced by an atom of the metal derived from the metal base. The mono-metal salt is preferred from the standpoint of economy since the salt must be neutralized in the preparation of a stable aqueous silanol dispersion of the invention, as hereinafter further discussed. However, with silane compositions in which the $r/Si$ ratio is higher than 1, e.g., 2, the formation of a di-metal salt may be necessary to obtain a siliconate that is water soluble.

When the hydrolyzable groups in a hydrolyzable silane composition which is mixed with an aqueous solution of an alkali or alkaline earth metal base in the preparation of a water-soluble siliconate are alkoxy groups (e.g., ethoxy groups), they are released during the reaction as an alcohol (e.g., ethyl alcohol). Usually it is preferable to add a small amount of alcohol (e.g., about 100 cc. per mol of hydrolyzable organosilane) when the reactants are mixed, since the presence of the alcohol, which acts as a mutual solvent for the silane and the water, makes the reaction proceed at a more even rate. This proportion of alcohol along with the alcohol that is formed during the hydrolysis may be recovered from the resulting siliconate solution by distillation.

When the hydrolyzable groups in a silane composition which is mixed with an aqueous solution of an alkali metal or alkaline earth metal base in the preparation of a water-soluble siliconate are halo groups, it is necessary to add the silane to the aqueous solution of the base dropwise and to maintain the temperature of the hydrolyzing solution at not more than about 10 degrees C. in order to obtain a soluble siliconate rather than a solution containing gel particles. Furthermore, the proportion of the base in the aqueous solution must be great enough not only to form a mono-metal salt of the resulting silanol but also to neutralize the hydrogen halide produced during the hydrolysis. Thus, it is usually more practical to convert halosilane starting materials to the corresponding alkoxysilane starting materials (recovering, of course, the hydrogen halide that is produced) and then to hydrolyze the alkoxysilane starting materials to produce a water-soluble siliconate.

It is preferable that the proportion of water in the solution of the alkali metal or alkaline earth metal base which is used in the preparation of a water-soluble siliconate be such that the resulting siliconate solution comprises at least about 50 to 70 percent of water. Although the proportion of water in the siliconate solution may be considerably higher, it is usually preferable to minimize the volume of solution to be handled by keeping the dilution of the siliconate solution at a minimum until the siliconate is converted to a silanol by adjusting the pH between 3 and 7 as hereinafter discussed. At the time when the siliconate is neutralized, it is desirable to add a considerable volume of water to obtain a very dilute aqueous silanol dispersion.

If desired, the hydrolyzable organosilane composition may be hydrolyzed by any of the well-known hydrolysis procedures to produce an organosilicone and the organosilicone may be mixed with an aqueous solution of an alkali metal base or an alkaline earth metal base, for example, in accordance with the procedures described in U.S. Patent No. 2,507,200.

In general, with the higher alkylsilanes such as butyl and amylsilanes and with the silane compositions having an $r/Si$ ratio higher than about 1, it is preferable to add the silane itself rather than a solution of its hydrolysis products to the aqueous solution of the base. The phenylsilanes and the lower alkylsilanes such as methyl and ethylsilanes, on the other hand, are readily soluble in an aqueous solution of a base even after they are hydrolyzed to partially condensed silicones.

An aqueous siliconate solution from which a stable aqueous silanol dispersion of the invention is produced is a highly stable alkaline solution. Such a siliconate solution resembles ordinary water glass except that it is a solution of a metal salt of an organosilicic acid rather than a solution of a metal salt of silicic acid. Since in the practice of the invention a metal siliconate is used in aqueous solution, the alkali metal base or alkaline earth metal base with which a hydrolyzable organosilane composition (or the hydrolysis products thereof) is mixed to produce a siliconate must be one which forms a soluble salt with the particular organosilanes employed. The sodium and potassium siliconates derived from any of the hydrolyzable organosilanes, hereinbefore described (or their hydrolysis products), are all water soluble, so that it is preferable that a siliconate employed in the present method be a siliconate of an alkali metal base such as sodium or potassium hydroxide.

An aqueous siliconate solution for use in the present method may be prepared, for example, by one of the following procedures:

(a) An aqueous solution of a vinyl siliconate is prepared by mixing vinyltriethoxysilane (190 grams) in a flask with water (168 grams) containing sodium hydroxide (40 grams) and ethanol (100 cc.) and distilling the resulting mixture until 190 grams of 90 percent ethanol have been recovered.

(b) An aqueous solution of a vinyl siliconate is prepared by adding vinyltrichlorosilane (1 mol) with stirring to concentrated hydrochloric acid (500 grams) and stirring the mixture for one-half hour after the addition is complete. A white powder (70 grams) forms, and is filtered off, washed with water and then dissolved in 1000 grams of water containing sodium hydroxide (1 mol).

(c) An aqueous solution of a phenyl siliconate is prepared by mixing phenyltriethoxysilane (240 grams) in a flask with water (168 grams) containing sodium hydroxide (40 grams) and ethanol (100 cc.) and distilling the resulting mixture until 148 grams of 90 percent ethanol have been recovered.

(d) An aqueous of an ethyl siliconate is prepared by mixing ethyltriethoxysilane (192 grams) in a flask with water (168 grams) containing sodium hydroxide (40 grams) and ethanol (100 cc.) and distilling the resulting mixture until 148 grams of 90 percent ethanol have been recovered.

(e) Ethyl alcohol (3.5 mols) is added slowly to a mixture comprising 1-butyltrichlorosilane (0.8 mol) and silicon tetrachloride (0.2 mol) in chloroform (3.5 mols) at room temperature. After the addition is complete, the mixture is refluxed overnight. The mixture is then placed in a flask containing anhydrous sodium carbonate (10 grams) and is distilled to obtain a mixture of 1-butyltriethoxysilane and ethyl orthosilicate. The mixture of silanes (109 grams) is placed in a flask with water (84 grams) containing sodium hydroxide (30 grams and ethanol (100 cc.). The mixture is distilled until 95 grams of 90 percent ethanol are recovered.

PRODUCTION OF AQUEOUS SILANOL DISPERSION

An aqueous silanol dispersion of superior stability is produced in accordance with the present method by bringing the pH of an aqueous solution comprising a siliconate of an alkali metal or an alkaline earth metal (prepared as hereinbefore described) to a value between 3 and 7 by contacting said solution with the hydrogen form of a cation exchanger.

The term "hydrogen form of a cation exchanger" is used herein to mean a chemically stable, water-insoluble substance having free acid groups such as phenolic, sulfonic, carboxylic, phosphonic, etc., groups as an integral portion of the material. Such a substance should be chemically stable so that it does not undergo degradation during use. If the substance is a polymer, it must be sufficiently cross-linked to have negligible solubility in water (and in any other solvent, such as an alcohol) that is present in the aqueous siliconate solution employed in the ion exchange process. Of course, the cation exchanger should be sufficiently hydrophilic to permit diffusion of ions through the structure at a finite and usable rate and should contain a sufficient number of accessible ionic exchange groups (i.e., acid groups).

In the practice of the invention, the preferred cation exchangers are those which give optimum exchange conversion conditions for the conversion of sodium, potassium, calcium, barium and strontium ions to hydrogen ions, and, of course, the specific active group in the cationic exchanger that is preferred depends upon the particular metal ion that is being exchanged for hydrogen. In general, the hydrogen form of a sulfonic acid cation exchanger is preferred for the neutralization of siliconates by the present method. Such sulfonic acid cation exchangers include: sulfonated coals (or carbonaceous zeolites), sulfonated aromatic hydrocarbon polymers including sulfonated polystyrene resins, sulfonated styrene-divinylbenzene copolymers, and sulfonated phenol-aldehyde resins. Other cation exchangers include the carboxylic-type whose cation exchange activity is the result of a carboxylic acid group, such as an exchanger from the alkaline oxidation of coal, or from the oxidation of coal with nitric acid, or the reaction product of phenol, acrolein and the semi-amide of oxamic acid, or the reaction product of caustic, resorcyclic acid and formaldehyde. Other cation exchangers whose exchange activities are associated with nuclear sulfonic, methylene sulfonic, carboxylic acid, phosphonic acid and phenolic groups, which are extensively known in the art of making cation exchange resins, may also be used in the practice of the invention.

The neutralization of a metal siliconate solution by reaction with a cation exchanger in accordance with the present method may be carried out as a batch operation or as a continuous process. If carried out as a batch operation, a volume of the aqueous metal siliconate solution, preferably comprising not more than about 4 percent by weight of the siliconate and most desirably about 1 to 2 percent by weight of the siliconate, is contacted with a sufficient amount of the cation exchanger to completely exchange the metal ions of the siliconate for hydrogen ions, and then the resulting aqueous siliconate dispersion is separated from the exchanger by filtration, decantation, centrifuging, etc. If the exchange reaction does not approach completion rapidly, a batchwise operation should be repeated with a fresh portion of the exchanger as many times as necessary in order to obtain complete transformation. This procedure is carried out more efficiently by first treating the siliconate solution with the exchanger that has already been used once and then treating the solution further with a fresh batch of exchanger, which is then used again for a fresh volume of the siliconate solution. The twice-used exchanger may then be regenerated (e.g., with a strong mineral acid such as hydrochloric acid) and reused. A batchwise method is acceptable for systems in which the equilibrium is quite favorable and in which the time necessary to pass the entire volume of the siliconate through a bed is prohibitive.

A columnar operation is ordinarily a good technique for conducting the neutralization as a continuous process, although a fluid bed technique of reaction may also be employed successfully. A columnar operation permits continuous contact of the cation exchanger with the siliconate solution, when necessary in order to drive the reaction to completion. The uppermost portion of the column is constantly contacting fresh metal siliconate solution whereas the lower portions contact the metal ions not adsorbed by the upper portion of the cation exchanger. Thus the cation exchanger bed becomes fully exhausted at the top first and then gradually downward.

USES

A stable aqueous silanol dispersion produced by the present method forms a much finer sol or colloid and, as hereinbefore demonstrated, is much more stable than a silanol dispersion produced by the neutralization of a siliconate without the use of a cation exchanger. Furthermore, a silanol dispersion produced by the present method is stable when the concentration of the silanol is as high as 3 or 4 percent by weight. For example, a vinyl silanol produced from a vinyl siliconate by the present method is stable (as evidenced by the lack of gel particles in the dilute sol) for two or three days at ordinary temperatures when the concentration of the silanol is from ½ to 1 percent by weight. Even when the concentration of the silanol is as high as 3 percent by weight, the aqueous silanol dispersion is stable for at least one day. Of course, the stability of the dilute silanol dispersions produced by the present method can be increased by storing the dispersions at temperatures lower than room temperature.

The stable aqueous silanol dispersions produced by the method of the invention are extremely useful in imparting water repellency to various materials. In fact, one of the most important embodiments of the present invention is a method of improving the water repellency of a surface that is reactive with a silanol which comprises applying a stable aqueous silanol dispersion produced by the method of the invention, at a pH between 3 and 8, to such a surface. The principal example of such a surface is a surface having hydroxyl groups. Of such hydroxylated materials that may be treated in accordance with the present method, the most important are siliceous materials and carbohydrates, including silicates (particularly, magnesium silicate), cellulose, porous ceramic materials, glass, clay noncarbonaceous masonry, sand and ores (for flotation). Other materials which may be effectively rendered water repellent by the present method include wood products, paper and mineral fillers (in addition to glass fillers and silicates) such as clay, mica and talc. The mineral fillers, i.e., fillers for use in, for example, molding compositions, which may be rendered water repellent by silanol dispersions produced by the method of the invention include asbestos. (The term "asbestos" is used herein to include not only the prevalent "Canadian asbestos," i.e., chrysotile, but also fibers of crystalline fibrous minerals consisting of anhydrous silicates of metals, i.e., fibers of the pyrobole family such as crocidolite pyroxenes, e.g., diopside and wollastonite, and the amphiboles, e.g., anthophyllite, tremolite and actinolite.)

The amount of silanol required to impart excellent water repellency is, in general, very low so that the silanols may be applied to the materials from extremely dilute solutions. Not only are the silanols very stable in low concentrations in aqueous solutions, but the use of dilute solutions facilitates the economical application of the silanols to the materials to be treated.

In general, the minimum amount of silanol used to treat a material is that which imparts an appreciable water repellent effect, i.e., reduction in the absorptivity of the material to water. The maximum amount of silanol used is that above which any increase in water repellency is not sufficiently great to make a larger amount of silanol economically feasible. The amount of silanol that is necessary to impart a given degree of water repellency to a material may depend, of course, upon the specific silanol employed, upon the specific material to be treated, and upon the pH at which the silanol is applied to the material. (Once the silanol adheres to the material to be treated, the pH may be raised above 8, for example as high as 10, if desired, but, of course, no water repellency is obtained is the pH is raised above 8 before the material to be treated has taken up the silanol solution.) In general, the amount of silanol that imparts water repellency to a material may be as low as 0.01 percent of the weight of the material, or even considerably lower. For example, in some cases, an amount of silanol that is as low as 0.001 percent of the weight of the material may impart water repellency. On the other hand, for some materials which are more difficult to render water repellent, the amount of silanol may be as high as 0.5 to 1 or 2 percent of the weight of the material to be treated, or higher, depending on the degree of water repellency that is desired.

The amount of silanol, expressed as "percent of the weight of material to be treated," means the weight of the silanol divided by the weight of the material times 100. The weight of the silanol is calculated herein as though all OH groups attached to silicon atoms in the silanol molecules were completely condensed during the reaction by which the silanol dispersion is obtained. (It is believed, of course, that actually in the preparation of the dispersion very little condensation of the OH groups attached to the silicon atoms in the silanol molecules takes place, and this method of calculation is used only for convenience in determining the concentration of silanol in a silanol dispersion.) Thus, for example, a butylsilanol in a dispersion derived from a butyltrichlorosilane is assumed to have the formula $BuSiO_{1.5}$ in calculating the percent of butylsilanol in the dispersion.

A particularly important application of the silanol dispersions produced by the method of the invention is in the treatment of glass bottles and other glass containers, as well as glass fibers and glass cloth. The treatment by the present method of the interior of a glass container for blood prevents coagulation at the blood-glass interface. The treatment of the interior of a glass container by the present method also permits the extraction of the last drop of an aqueous material such as penicillin from the container, and the treatment of the exterior of a glass container by the present method prevents an aqueous liquid from running down the outside of the container.

The treatment of any of the above described materials with an aqueous silanol dispersion of the invention consists in simply immersing the material to be treated in the aqueous silanol dispersion, or applying the dispersion to the material with an ordinary paint brush until the amount of silanol adhering to the material is within the desired range, as hereinbefore discussed, and then drying the material, e.g., by moderate heating or by air-drying. When a silanol dispersion produced by the method of the invention is dried after being applied to a material to be treated, condensation of the silanol takes place to form an insoluble, water repellent silicone.

A particular advantage of the silanol dispersions produced by the present method is that they contain no salts since no acid is employed in the neutralization of the alkali metal or alkaline earth metal siliconates in the production of the silanols. Thus, in the treatment of materials to be used in electrical applications with the present silanol dispersions to impart water repellency (e.g., in the sizing of glass fibers) there is no salt to be washed out of the treated material.

*Example*

An aqueous silanol dispersion is produced in accordance with the present method by the following procedure:

An aqueous solution at room temperature of an organic siliconate of an alkali metal or an alkaline earth metal (e.g., 60 grams of one of the sodium siliconate solutions prepared as hereinbefore described, diluted to comprise about 98 percent water) is drawn with suction through a glass tube approximately two and one-half inches in diameter and thirty inches in length that is one-half filled with a cationic exchanger (e.g., one of the cationic exchangers herein before described). The resulting silanol dispersion may be used to impart marked water repellency to the siliceous materials and carbohydrates hereinbefore described.

What I claim is:

1. A method of producing a substantially salt-free aqueous silanol dispersion of superior stability that comprises bringing the pH of an aqueous solution consisting essentially of water and a water-soluble salt of an organo-substituted silicic acid and of a metal of the class consisting of alkali metals and alkaline earth metals to a value between 3 and 7 by contacting said solution with the hydrogen form only of an insoluble cation exchanger, the average number of organic groups attached to each silicon atom being from .05 to 3, and said organic groups being of the class consisting of saturated aliphatic hydrocarbon groups having from one to five carbon atoms, olefinically unsaturated hydrocarbon groups having from two to five carbon atoms, and aromatic hydrocarbon groups having from six to seven carbon atoms.

2. A method as claimed in claim 1 wherein the average number of organic groups attached to each silicon atom is from 1 to 2.

3. A method as claimed in claim 1 wherein the metal is an alkali metal.

4. A method of producing a substantially salt-free aqueous silanol dispersion of superior stability that comprises passing an aqueous solution consisting essentially of water and a water-soluble alkali-metal salt of an organo-substituted silicic acid over the hydrogen form only of an insoluble cation exchanger and maintaining contact between the said solution and the said exchanger until the pH of said solution is reduced to a value between 3 and 7, the average number of organic groups attached to each silicon atom in said salt being from about 1 to about 2 and said organic groups being aromatic hydrocarbon groups having from six to seven carbon atoms.

5. The method of claim 1 in which the organic groups are saturated aliphatic hydrocarbon groups having from one to five carbon atoms.

6. A method of producing a substantially salt-free aqueous silanol solution of superior stability that comprises passing an aqueous solution consisting essentially of water and an alkali-metal salt of an organo-substituted silicic acid over the hydrogen form only of an insoluble cation exchanger and maintaining the contact between the said solution and the said exchanger until the pH of the solution is between 3 and 7, the average number of organic groups attached to each silicon atom in said salt being from about 1 to about 2, and said organic groups being an alpha-beta unsaturated alkenyl group having from two to five carbon atoms.

7. A method of producing a substantially salt-free vinyl silanol solution of superior stability and reactivity which comprises bringing an aqueous solution consisting essentially of water and a water-soluble alkali-metal salt of a vinyl-substituted silicic acid into intimate contact with the hydrogen form only of an insoluble cation exchanger and maintaining contact between the said exchanger and the said solution until the pH of said solution is between 3 and 7, the average number of vinyl groups attached to each silicon atom in said salt being not less than 0.05 nor more than 2.

8. A method of producing a substantially salt-free phenyl silanol solution of superior stability and reactivity which comprises bringing an aqueous solution consisting essentially of water and a water-soluble alkali-metal salt of a phenyl-substituted silicic acid into intimate contact with the hydrogen form only of an insoluble cation exchanger and maintaining said contact until the pH of the solution is between 3 and 7, the average number of phenyl groups attached to each silicon atom in said salt being not less than 0.05 nor more than 2.

9. A substantially salt-free aqueous silanol dispersion produced according to the method of claim 1.

References Cited in the file of this patent

UNITED STATES PATENTS

| | | |
|---|---|---|
| 2,441,423 | Elliott et al. | May 11, 1948 |
| 2,600,307 | Lucas et al. | June 10, 1952 |
| 2,646,441 | Duane | July 11, 1953 |
| 2,683,097 | Biefeld | July 6, 1954 |

OTHER REFERENCES

Kunin et al.: "Ion Exchange Resins," Wiley, 1950, pages 77, 137, and 139.

UNITED STATES PATENT OFFICE
CERTIFICATE OF CORRECTION

Patent No. 3,046,242                                July 24, 1962

Thomas R. Santelli

It is hereby certified that error appears in the above numbered patent requiring correction and that the said Letters Patent should read as corrected below.

Column 2, line 14, for "desclosed" read -- disclosed --; line 15, for "in", first occurrence, read -- is --; line 37, for "bring" read -- bringing --; column 3, line 19, for "than" read -- that --; column 11, line 44, for "is" second occurrence, read -- if --.

Signed and sealed this 26th day of March 1963.

(SEAL)
Attest:
ESTON G. JOHNSON

Attesting Officer

DAVID L. LADD
Commissioner of Patents